(12) United States Patent
Park et al.

(10) Patent No.: US 9,326,224 B2
(45) Date of Patent: Apr. 26, 2016

(54) METHODS AND ARRANGEMENTS FOR ADVERTISING SERVICES IN WIRELESS NETWORKS

(71) Applicant: Intel Corporation, Santa Clara, CA (US)

(72) Inventors: Minyoung Park, Portland, OR (US); Sanghoon Kim, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 13/730,978

(22) Filed: Dec. 29, 2012

(65) Prior Publication Data

US 2014/0185468 A1  Jul. 3, 2014

(51) Int. Cl.
*H04W 4/00* (2009.01)
*H04W 48/16* (2009.01)

(52) U.S. Cl.
CPC .................................... *H04W 48/16* (2013.01)

(58) Field of Classification Search
CPC ... H04W 16/26; H04W 52/241; H04W 80/02; H04W 36/30; H04W 40/12; H04W 52/226
USPC ................. 370/315, 328, 252, 331
See application file for complete search history.

(56) References Cited

U.S. PATENT DOCUMENTS

| | | | | |
|---|---|---|---|---|
| 8,649,791 | B1* | 2/2014 | Wohld | 455/446 |
| 2007/0076595 | A1* | 4/2007 | Lee et al. | 370/222 |
| 2009/0219852 | A1* | 9/2009 | Youn et al. | 370/315 |
| 2009/0247084 | A1* | 10/2009 | Palanki | 455/63.1 |
| 2010/0216470 | A1* | 8/2010 | Pamp et al. | 455/436 |
| 2010/0265913 | A1* | 10/2010 | Gorokhov et al. | 370/331 |
| 2010/0296475 | A1* | 11/2010 | Visotsky et al. | 370/329 |
| 2010/0329195 | A1* | 12/2010 | Abraham et al. | 370/329 |

(Continued)

FOREIGN PATENT DOCUMENTS

| | | |
|---|---|---|
| JP | 2009-218972 A | 9/2009 |
| JP | 2011-125036 A | 6/2011 |

(Continued)

OTHER PUBLICATIONS

International Search Report and Written Opinion received for PCT Patent Application No. PCT/US2013/048824, mailed on Oct. 16, 2013, 12 pages.

(Continued)

*Primary Examiner* — Dang Ton
*Assistant Examiner* — Sai Aung
(74) *Attorney, Agent, or Firm* — Schubert Law Group PLLC

(57) ABSTRACT

Logic may decide which service advertisement information to transmit in a service advertisement frame based on link margin information of each service advertisement received. Logic may filter the service advertisement information to avoid advertising service information for service providers that cannot be reached. A first station may receive a service advertisement from a second station and determine whether to include the service advertisement with a transmission of the first station's service advertisement based upon perceived proximity of the second station. A station may generate a Leaving Message if a user terminates service advertisements of the station or the station appears to be moving away from a service advertisement group. In response to receiving a Leaving Message from a neighboring station, a station may remove the neighboring station from a list of service providers maintained by the station.

26 Claims, 6 Drawing Sheets

(56) References Cited

U.S. PATENT DOCUMENTS

2011/0007653 A1* 1/2011 Casaccia et al. ............. 370/252
2011/0090880 A1* 4/2011 Abraham et al. ............. 370/338
2011/0317719 A1* 12/2011 Vedantham et al. .......... 370/469
2013/0344913 A1* 12/2013 Li et al. ........................ 455/522

FOREIGN PATENT DOCUMENTS

| KR | 10-2007-0061161 A | 6/2007 |
| KR | 10-2011-0067502 A | 6/2011 |
| WO | 2010/022374 A1 | 2/2010 |
| WO | 2014/105211 A1 | 7/2014 |

OTHER PUBLICATIONS

International Preliminary Report on Patentability (Chapter I of the PCT) received for PCT Patent Application No. PCT/US2013/048824, mailed on Jul. 9, 2015, 8 pages.

* cited by examiner

METHODS AND ARRANGEMENTS FOR ADVERTISING SERVICES IN WIRELESS NETWORKS

BACKGROUND

Embodiments are in the field of wireless communications. More particularly, the present disclosure relates to filtering service advertisements for transmission and removing service providers that provide service advertisements.

DETAILED DESCRIPTION OF EMBODIMENTS

Figure 1:
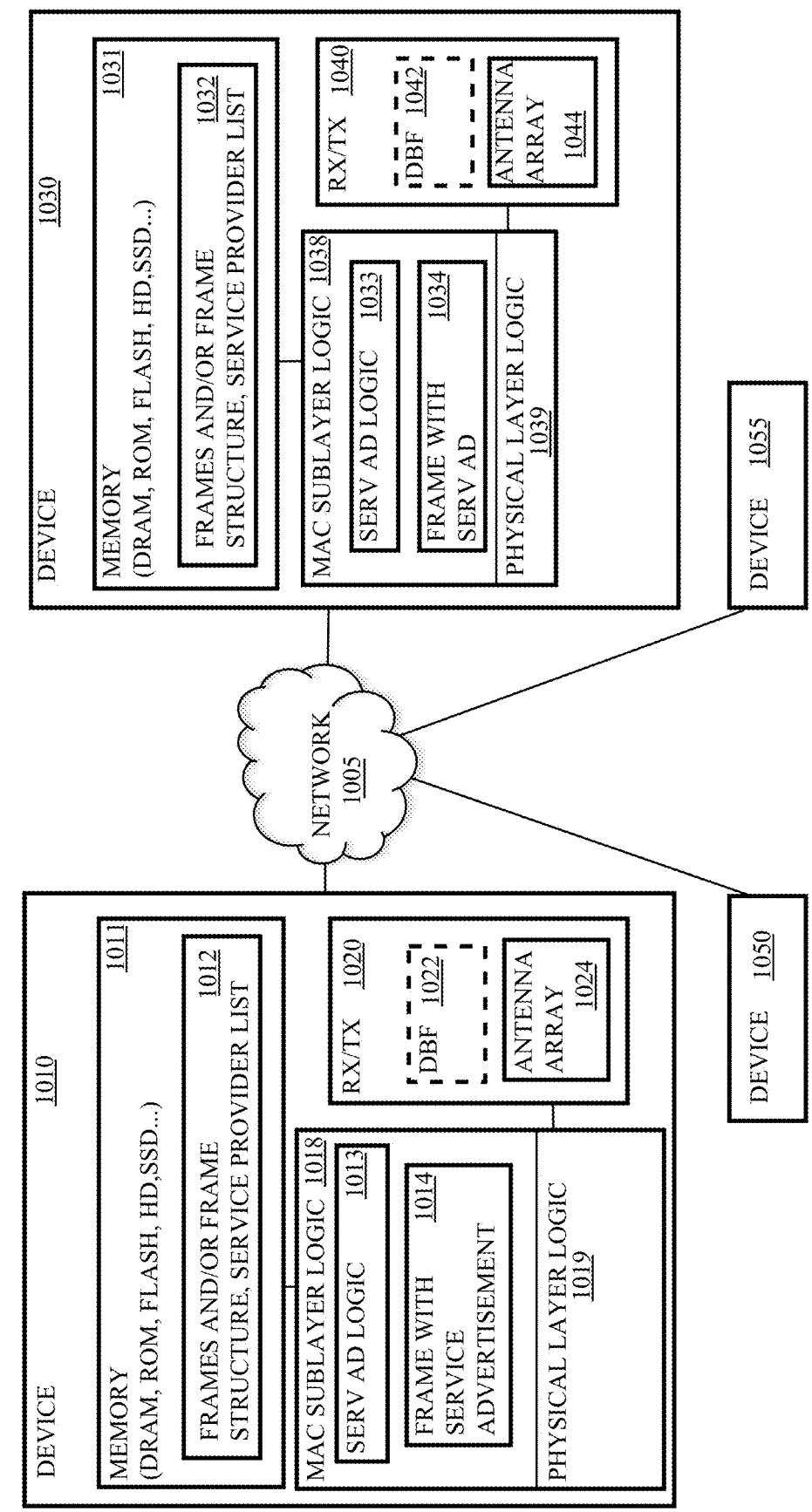
FIG. 1 depicts an embodiment of a wireless network comprising a plurality of communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments may decide which service advertisement information to transmit in a service advertisement frame based on link margin information such as the received signal strength of each service advertisement received. Many embodiments may filter the service advertisement information to avoid advertising service information for service providers that cannot be reached. In several embodiments, a first station may receive a service advertisement from a second station and determine whether to include the service advertisement with a transmission of the first station's service advertisement based upon perceived proximity of the second station. In particular, the first station may determine a proximity of the second station based upon the received signal strength of the service advertisement received from the second station. In many embodiments, if the first station decides to retransmit the service advertisement for the second station, the first station may add the second station as a service provider in a list of service providers for which the first station retransmits service information.

In further embodiments, a station may generate a Leaving Message if a user terminates service advertisements of the station or, in some embodiments, the station appears to be moving away from a service advertisement group. For instance, logic of the station may determine that the station appears to be moving away if the station misses N1 service advertisements from N neighboring stations, wherein N1 is less than or equal to N. In further embodiments, the station may determine that it is moving away if the station loses a connection to an access point and also misses N2 service advertisements from neighboring nodes, wherein N2 is less than or equal to N. In some embodiments, N2 may be less than N1 because of the additional information available to the station based upon the access point connection.

In response to receiving a Leaving Message from a neighboring station, a station may remove the neighboring station from a list of service providers maintained by the station. In several embodiments, the station may also inform other neighboring stations in a service advertisement group about the Leaving Message.

Service discovery is a protocol that allows devices to find available services without intervention of users and may be combined with wireless device such as smartphones and tablets. Wireless devices can find available services in the near area, from neighboring stations, automatically. For example, friends in the same area can play games together over the phone and discounts available at a nearby mall can pop up on a smartphone as the user passes.

In order to implement service discovery protocols for wireless devices, such service discovery protocols should scale well. As the number of services increase, the potential network overhead incurred from service discovery protocol can utilize significant network resources. For instance, the services applications executing on a device should advertise their presence to potential users to be found and utilized. The number of service advertisements increase with the number of devices and number of available services on each device.

Embodiments may address this problem when a device receives a neighbors' service advertisement information, by retransmitting the neighbor's service advertisement information together with its own advertisement information. The neighboring devices can do the same and thus the devices can advertise less frequently by relying on each other for the advertisement of services. However, advertising services to a station for which the services are not available or after the services are no longer available also adds to the network overhead.

Various embodiments may be designed to address different technical problems associated with filtering service advertisements for a large number of devices. For instance, some embodiments may be designed to address one or more technical problems such as determining which service advertisements may not be available to at least some neighboring stations and determining when to stop retransmitting service advertisements for another station.

Different technical problems such as those discussed above may be addressed by one or more different embodiments. For instance, some embodiments that determine which service advertisements may not be available to at least some neighboring stations may do so by one or more different technical means such as inclusion of a field value for transmission power, determining a value for received signal strength, determining a link quality value, comparing the link quality to a threshold for link quality, maintaining and updating a service provider list with service information for each included service provider, and generating, receiving, decoding, interpreting and removing service providers from the list in response to Leaving Messages indicative of an unavailability of services by a service provider.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/get-ieee802/download/802.11-2012.pdf).

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

Initially, service advertisement logic 1033 of the communications device 1030 may transmit a service advertisement frame 1034. The neighboring communications devices such as the communications devices 1010, 1050, and 1055 may receive the service advertisement frame 1034 and, in response, the devices may make a determination regarding whether or not the devices should retransmit service information from the service advertisement frame 1034. In many embodiments, the devices 1010, 1050, and 1055 each device may make an independent determination regarding whether or not the device should retransmit service information from the service advertisement frame 1034. In several embodiments, the devices 1010, 1050, and 1055 may maintain separate lists of service providers for which the devices will retransmit service information. In other embodiments, more than one of the devices 1010, 1050, and 1055 may maintain a common list of service providers for which the devices 1010, 1050, and 1055 may retransmit the service information. In some embodiments, the list of service providers also comprises a link quality index such as a path loss value.

In some embodiments, the communications device 1030 may include a transmit power value to indicate the transmit power used for the service advertisement frame transmission, a service provider address indicating the address of the communications device 1030, a link quality index (LQI) to indicate the quality of the link to the service at the communications device 1030, and service information to describe the services offered. For instance, when the communications device 1030 is advertising its own services, the LQI may be set to zero to indicate no path loss. However, when the communications device 1010 is retransmitting a service offered by the communications device 1030, the communications device 1010 may include an LQI value associated with the quality of the link through which the communications device 1010 received the service advertisement from the communications device 1030.

In some embodiments, the service advertisement logic 1013 may determine the LQI via a path loss calculation that subtracts the received signal strength (Prx) at the communications device 1010 from the transmission power (Ptx) indicated in the service advertisement frame 1034 from the communications device 1030. In particular, the service advertisement logic 1013 may calculate the path loss (PL) as Ptx minus Prx, wherein Ptx and Prx are in decibels per milliwatt (dBm) and Prx is calculated from the received signal strength index (RSSI).

The service advertisement logic 1013 may measure the RSSI of the received service advertisement frame 1034 at the time of receipt and then calculate a dBm value representative of the RSSI. The service advertisement logic 1033 may determine the LQI of the service provider, the communications device 1030, by adding the LQI calculated for the service advertisement, which is the PL in the present embodiment, with the LQI provided in the service advertisement frame 1034 with the service information for the communications device 1030, which is zero in the present embodiment because the communications device 1030 is advertising its own service.

The communications device 1010 may determine whether the communications device 1010 should retransmit the advertisement, which is based upon link margin information such as the LQI determined for the communications device 1030. In many embodiments, if the LQI for the communications device 1030 is greater than a threshold LQI, the communications device 1010 will save the communications device's 1030 service information in a list of service providers and retransmit the service information with the communications device's 1010 own service information. For instance, if the communications device 1030 is a new service provider for the service providers list and if the LQI (path loss) value is smaller than an LQI, or path loss, threshold, the service advertisement logic 1013 adds the new service provider to the service provider list by storing, e.g., a source address, the calculated LQI, one or more service identifiers, and possibly options for the one or more service identifiers in memory 1011.

On the other hand, if the communications device 1030 is an existing service provider in the service provider list of the communications device 1010, the service advertisement logic 1013 updates the service information entry of the communications device 1030 in the service provider list if the below conditions are satisfied:

i. The service information of the service provider in the received service advertisement frame 1034 has updated service information,
ii. The updated LQI (or updated path loss) value of the service provider (communications device 1030) is smaller than the LQI (or path loss) threshold.

Thereafter, the service advertisement logic 1013 may transmit a service advertisement frame 1014 with the updated list of service providers.

On the other hand, if the service advertisement logic 1013 calculates the LQI for the communications device 1030 and determines that the LQI is greater than the LQI threshold, the communications device 1010 may determine that the communications device 1010 should not retransmit the service advertisement for the communications device 1030. In many embodiments, the greater LQI may result from lack of proximity, presence of obstructions, and/or presence of interference. In any case, if the LQI is higher than the LQI threshold, the communications device 1010 may determine that the link margin information for the communications device 1030 is too poor to repeat the service advertisements for the communications device 1030. In such situations, the communications device 1010 may not add the communications device 1030 as a new service provider or may remove the communications device 1030 as an existing service provider from the list of service providers maintained by the communications device 1010.

In some embodiments, the service advertisement logic 1013, 1033 may also determine when to transmit a Leaving Message or remove a service provider from the list of service providers in response to receipt of a Leaving Message. The Leaving Message may be an indication from a communications device such as the communications device 1030 that the device is moving away or otherwise going to discontinue transmission of service advertisements to and/or for the neighboring devices.

The service advertisement logic 1013, 1033 may determine to transmit a Leaving Message if the device is moving away from a service group, if the user stops service advertisement, and/or to retransmit a Leaving Message if other devices transmit a Leaving Message. More specifically, the service advertisement logic 1013, 1033 may determine the device is moving away from a service group in the case that the service advertisements are synchronized and transmitted periodically and the device misses 'n1' service advertisements from the N (N>=n1) neighboring devices. In some embodiments, the decision parameter 'n1' may be determined according to the system characteristics.

The service advertisement logic 1013, 1033 may determine the device is moving away from a service group in the case that the device was connected but lost the connection to an access point (AP) such as the communications device 1010 and the service advertisement may be synchronized and transmitted periodically but the device misses 'n2' service advertisements from the N (N>=n2) neighboring devices. The decision parameter 'n2' can be smaller than 'n1' because the device has additional information based on the connection to the AP.

The service advertisement logic 1013, 1033 may determine that the user requests to stop the service advertisements and may, in response, transmit the Leaving Message before it stops the service advertisements. Furthermore, the service advertisement logic 1013, 1033 may retransmit a Leaving Message if other devices transmit a Leaving Message as well as update their lists of service providers with available services.

In response to receiving a Leaving Message, the service advertisement logic 1013, 1033 may remove the corresponding service provider from the service advertisement logic's list of service providers. For cases in which a group of two or more devices maintain a common list of service providers, either of the devices' service advertisement logic may remove the corresponding service provider from the common list of service providers.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as a service advertisement frame structure, a service provider element structure, a service information element structure, and the like.

The MAC sublayer logic 1018, 1038 may comprise logic to implement functionality of the MAC sublayer of the data link layer of the communications device 1010, 1030. The MAC sublayer logic 1018, 1038 may generate the frames such as management frames and the physical layer logic 1019, 1039 may generate physical layer protocol data units (PPDUs) based upon the frames. For example, the frame builder 1013 may generate frames with a service advertisement 1014, 1034 and the data unit builder of the physical layer logic 1019, 1039 may encapsulate the frames with preambles to generate PPDUs for transmission via a physical layer device such as the transceivers represented by receive/transmit chains (RX/TX) 1020 and 1040.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal subcarrier signals are used to carry data. The data is divided into several parallel data streams or channels, one for each subcarrier. Each sub-carrier is modulated with a modulation scheme at a low symbol rate, maintaining total data rates similar to conventional single-carrier modulation schemes in the same bandwidth.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 1A:
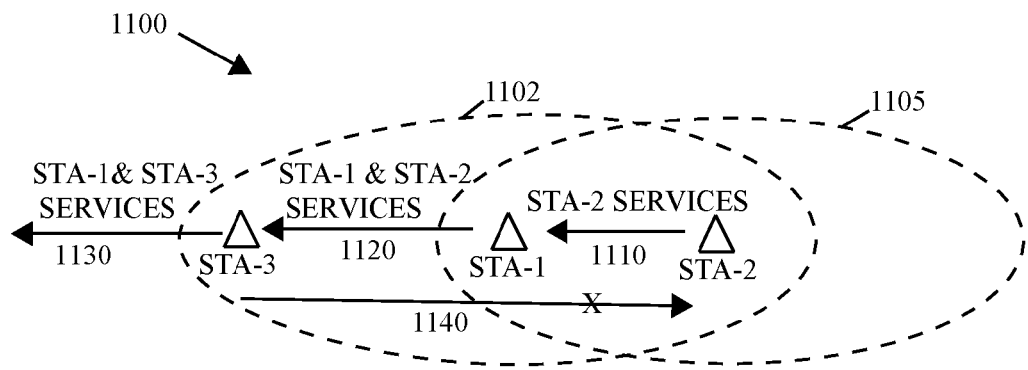
FIGS. 1A-B depict embodiments of filtering service advertisements for transmission and removing service providers that provide service advertisements.

FIG. 1A depicts an embodiment 1100 of filtering service advertisements for transmission in a multi-hop scenario. In this embodiment, the station STA-1 has a communications range 1105 and the station, STA-1 has a communications range 1102 that includes a station STA-3 at the edge of the range 1102. Note that STA-3 is not within the range 1105. STA-2 transmits 1110 a service advertisement to STA-1 and STA-1 adds STA-2 to STA-1's list of service providers. STA-1 advertises 1120 STA-2's service information within the range 1102 and STA-3 receives the service information of STA-2 from STA-1. However, STA-3 is unable to communicate 1140 with STA-2 because they are too far apart. The service advertisement logic of STA-3 determines that the LQI indicated by STA-1 for STA-2's service information plus the LQI of the transmission from STA-1 to STA-3 is greater than the LQI threshold so STA-3 does not add STA-2 as a service provider in STA-3's list of service providers. However, the LQI of the STA-1 is smaller than the LQI threshold so STA-3 transmits 1130 a service advertisement with both the service information of STA-1 and STA-3. Note that STA-2 and STA-1 may be within a first service advertisement group and STA-1 and STA-3 may be part of a second service advertisement group.

Figure 1B:
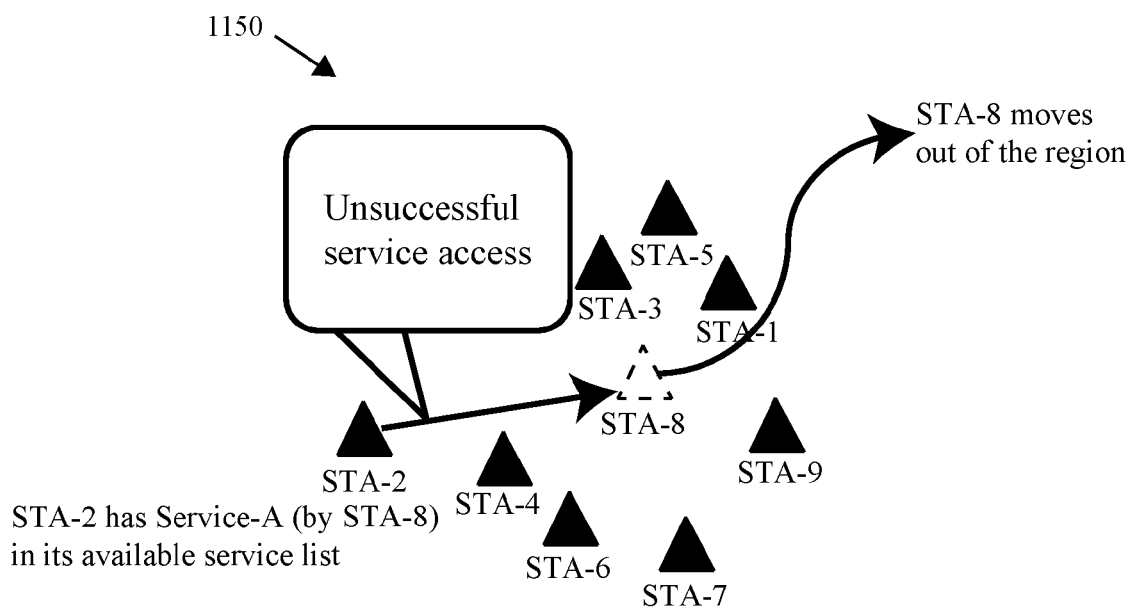

FIG. 1B depicts an embodiment 1150 of filtering service advertisements that involves removing service providers that provide service advertisements. In the present embodiment, the stations STA-1 through STA-9 may be part of a service advertisement group. The user of STA-8, which might be, e.g., a laptop or a smartphone, may decide to leave the area. While leaving the area, the stations within the service advertisement group will eventually be too far away from STA-8 to receive or utilize the services of STA-8 as is illustrated with STA-2. STA-2 has STA-8 in STA-2's list of service providers.

In the present embodiment, service advertisement logic of STA-8 may determine that STA-8 is leaving the area and transmit a Leaving Message to indicate that neighboring stations so that the service information of STA-8 can be removed from the list of service providers for the remaining stations STA-1 through STA-7 and STA-9. In some embodiments, service advertisement logic of STA-8 may transmit a Leaving Message when STA-8 misses 'n1' service advertisements from the N (N>=n1) neighboring stations. The decision parameter 'n1' may be chosen based upon system characteristics and/or may be set as a default. In some embodiments, service advertisement logic of STA-8 may transmit a Leaving Message when a connection to an AP is lost and STA-8 misses 'n2' service advertisements from the N (N>=n2) neighboring stations. The decision parameter 'n2' may be smaller than 'n1' because STA-8 has additional information based on the connection to the AP.

Note that in other embodiments, one or more of the stations STA-1 through STA-9 may maintain a common list of service providers. When the stations do not maintain a common list of service providers but maintain their own list of service providers, the stations that received a Leaving Message update their list of service providers by deleting the services related to the leaving station. The stations that received Leaving Message may inform other stations in the region about the change. When the stations are maintaining a common list of service providers, any station that received Leaving Message may update the common list of service providers and inform other stations about the update via the service advertisement logic.

Figure 1C:
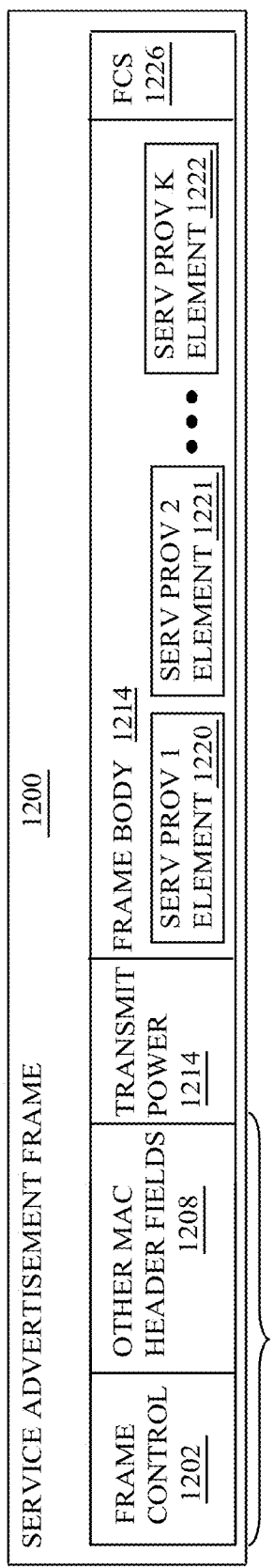
FIGS. 1C-E depict embodiments of a service advertisement frame, a service provider element, and a service information element for communications between wireless communication devices.

FIG. 1C depicts an embodiment of a service advertisement frame 1200 for communications between wireless communication devices such as communications devices 1010, 1030, 1050, and 1055 in FIG. 1. The service advertisement frame 1200 may comprise a MAC header 1201, a frame body 1214, and a frame check sequence (FCS) field 1226. The MAC header 1201 may comprise the frame control field 1202, other MAC header fields 1208, and a transmit power field 1214. The frame control field 1202 may be two octets and may identify the type and subtype of the frame such as a service advertisement frame. The other MAC header fields 1208 may comprise, for example, one or more address fields, identification fields, control fields, or the like. The transmit power field may comprise a value representing the transmit power used for the service advertisement frame transmission.

Figure 1D:
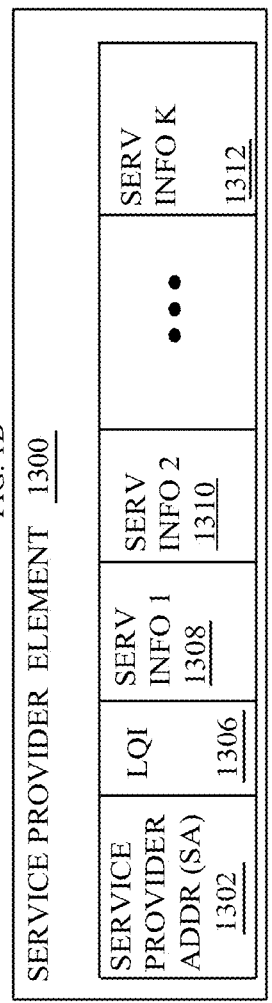

In some embodiments, the service advertisement frame 1200 may comprise a frame body 1214. The frame body 1214 may be a variable number of octets and may include data elements, control elements, or parameters and capabilities. In the present embodiment, the frame body 1214 comprises a one or more service provider elements 1220, 1221, and 1222 such as a service provider element 1300 as illustrated in FIG. 1D. In other embodiments, the service advertisement frame 1200 may also be used as the Leaving Message by including a bit or bits in one of the fields or in the frame body 1214 such as in an element that is indicative of the termination of the services by the service provider. For instance, the Leaving Message may comprise the service advertisement frame 1200 with a service provider element with an LQI set to a value that is greater that the LQI threshold or with a transmit power that will generate an updated LQI that will be greater than the LQI threshold. In other embodiments, the service provider element has a field for indicating the Leaving Message or can be otherwise presented in a manner that indicates the Leaving Message.

FIG. 1D illustrates an embodiment of a service provider element 1300. The service provider element 1300 may comprise fields such as a service provider address (SA) field 1302, a link quality index (LQI) field 1306, and one or more service information elements 1310 through 1312. The SA field 1302 may comprise the address of the service provider. The LQI field 1306 may comprise a zero if this is the service of the station that generates the service provider element 1300. Otherwise, the LQI field 1306 may comprise a link quality index such as a path loss value associated with the service provider by the station that generates the service provider element 1300. Each service provider may contain one or more services and service information 1 1308, service information 2 1310, through service information K 1312 may provide service information elements descriptive of each of the services provided by the service provider that is represented in the service provider element 1300.

Figure 1E:
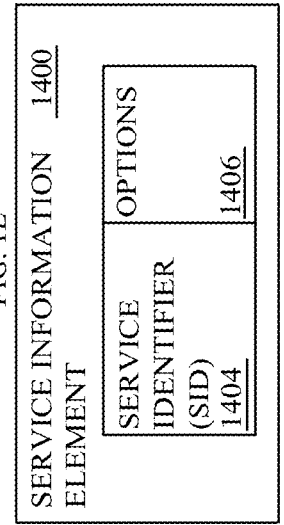

FIG. 1E depicts a service information element 1400 such as the service information elements 1308 through 1312 illustrated in FIG. 1D. The service information element 1400 may comprise a service identifier (SID) field 1404 and an options field 1406. The SID field 1404 may identify a particular type of service such as message distribution services, authentication services, traffic related services, or the like. The options field 1406 may contain other service related information.

Referring again to FIG. 1C, in many embodiments, the management frame 1200 may comprise a frame check sequence (FCS) field 1226. The FCS field 1226 may be four octets and may include extra checksum characters added to the short frame 1060 for error detection and correction.

Figure 2:
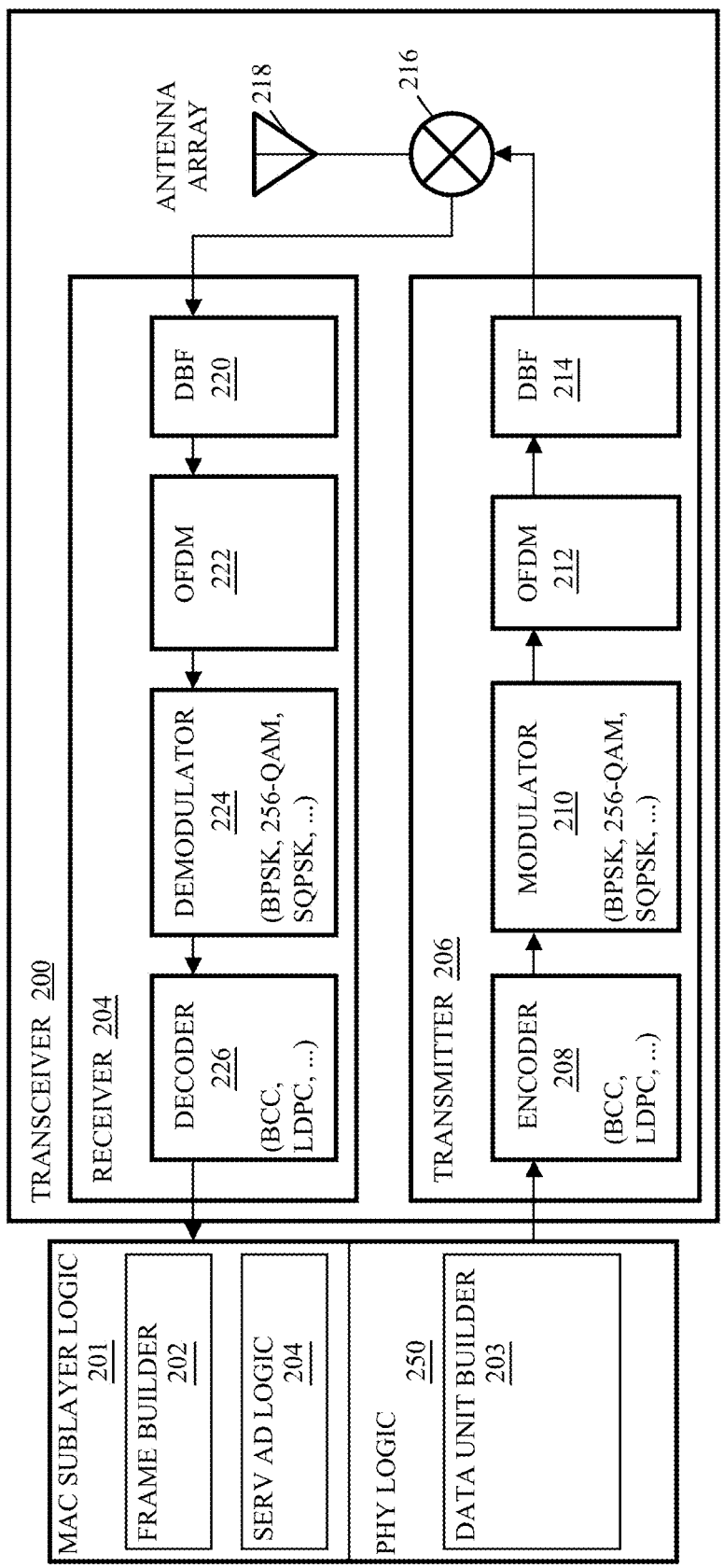
FIG. 2 depicts an embodiment of an apparatus to generate, transmit, receive and interpret a frame with a service advertisement frame.

FIG. 2 depicts an embodiment of an apparatus to generate, transmit, receive, and interpret or decode a service advertisement frame with service provider elements and service information elements such the service advertisement frame 1200 illustrated in FIG. 1C. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by encapsulating the frame or multiple frames, MAC protocol data units (MPDUs), with a preamble to transmit via transceiver 200.

In many embodiments, the MAC sublayer logic 201 may comprise a frame builder 202 coupled with service advertisement logic 204 to generate frames such as one of the service advertisement frame 1200 illustrated in FIGS. 1C-E. The PHY logic 250 may comprise a data unit builder 203. The data unit builder 203 may determine a preamble to encapsulate the MPDU or more than one MPDUs to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of subcarriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU or more than one MPDUs, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may decode or parse the MPDU or MPDUs to determine the particular type of frame or frames such as service advertisement frames and identify one or more service provider elements and service information elements included in the MPDU(s).

Figures 3A, 3B:
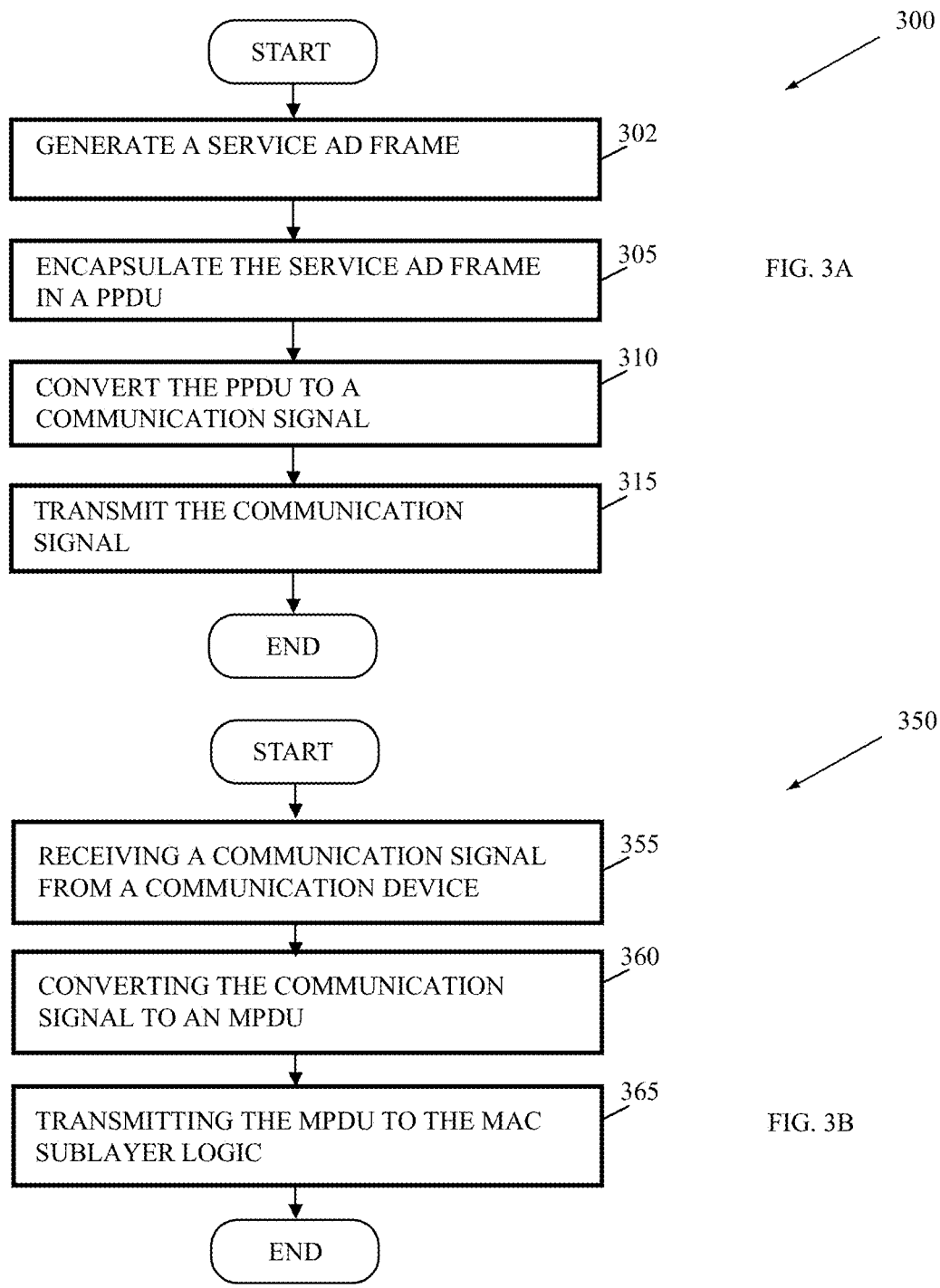
FIGS. 3A-B depict embodiments of flowcharts to generate, transmit, receive, and interpret communications with service advertisement frames.

FIGS. 3A-B depict embodiments of flowcharts 300 and 350 to transmit, receive, and interpret or decode communications with a service advertisement frame such as the service advertisement frame 1200 illustrated in FIGS. 1C-E. Referring to FIG. 3A, the flowchart 300 may begin with generating a service advertisement frame in MAC logic of a communications device such as the communications device 1030 illustrated in FIG. 1. The service advertisement frame may comprise a first service provider element such as the service provider element 1300 illustrated in FIG. 1D to describe services provided by the communications device and one or more other service provider elements to advertise services of other communications devices within a service advertisement group.

After the MAC logic generates the service advertisement frame, the physical layer logic may receive the service advertisement frame. The MAC logic of the communications device may pass the frame as an MPDU to a data unit builder that transforms the data into a packet that can be transmitted to a station. The data unit builder may generate a preamble to encapsulate one or more of the MPDUs from the frame builder to form a PPDU for transmission (element 305).

The PPDU may then be transmitted to the physical layer device such as the transmitter 206 in FIG. 2 or the transceiver 1020, 1040 in FIG. 1 so the PPDU may be converted to a communication signal (element 310). The transmitter may then transmit the communication signal via the antenna (element 315).

Referring to FIG. 3B, the flowchart 350 begins with a receiver of a station such as the receiver 204 in FIG. 2 receiving a communication signal via one or more antenna(s) such as an antenna element of antenna array 218 (element 355). The receiver may convert the communication signal into one or more MPDUs in accordance with the process described in the preamble (element 360). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 360) and transmits the one or more MPDUs to MAC sublayer logic such as MAC sublayer logic 202 (element 365).

The MAC sublayer logic may decode the service provider elements in each of the MPDUs. For instance, the MAC sublayer logic may parse the service provider elements to determine the LQI value and to calculate an updated LQI value to determine whether the station should retransmit the service information for the service provider. In some embodiments, the MAC sublayer logic may determine that the LQIs of one or more of the service provider elements meet the LQI threshold requirements for retransmitting the service information so the station may add the corresponding one or more service providers to a list of service providers for which the station retransmits service information. In another embodiment, the service advertisement frame may represent a Leaving Message and the station may remove the service provider from the list of service providers maintained by the station. In some of these embodiments, the station may retransmit the Leaving Message to other stations.

Figure 4A:
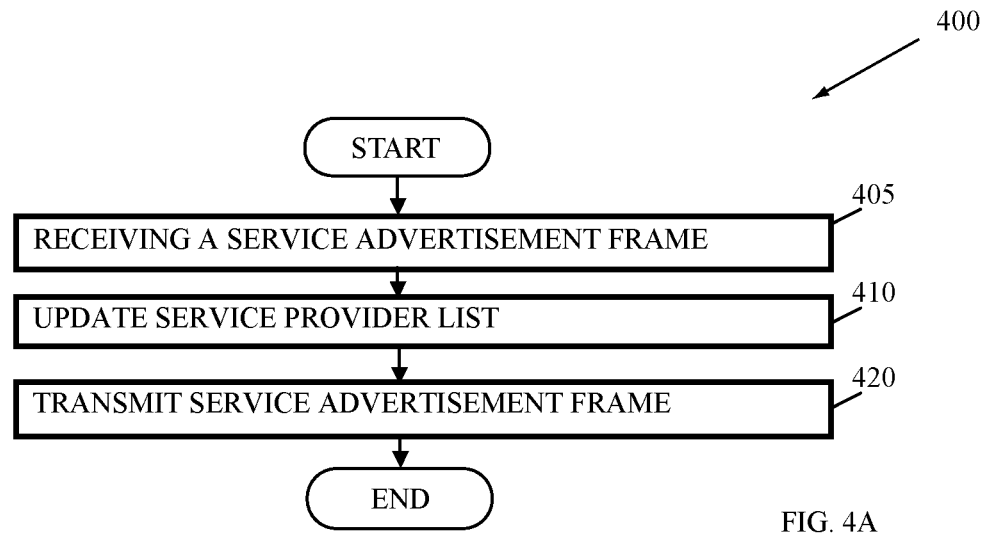
FIGS. 4A-C depict embodiments of flowcharts to receive, decode, filter, and retransmit service advertisement frames and to determine to transmit, transmit, receive, decode, parse, and interpret Leaving Messages.
Figure 4B:
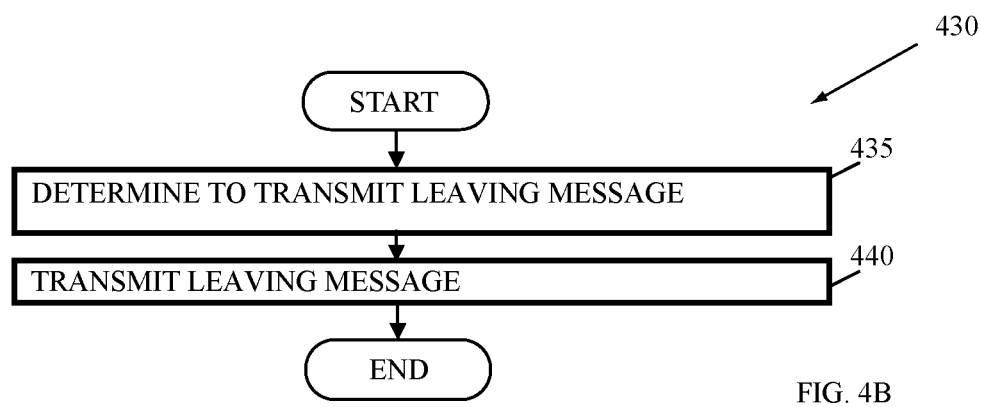

FIGS. 4A-B depict embodiments of flowcharts to receive, decode, parse, and interpret service advertisement frames with service provider elements and service information elements such as those illustrated in FIGS. 1C-E. In FIG. 4A, the flowchart 400 begins with receiving a service advertisement frame (element 405).

After receiving the service advertisement frame, the PHY logic may decode the fields of the service advertisement frame such as the MAC header and then decode the frame body. In several embodiments, after the PHY logic decodes the frame body and passes the decoded frame to the MAC logic, the MAC logic may perform a cyclic redundancy check and parse the service advertisement frame to identify one or more service provider elements. In many embodiments, the MAC logic may access memory such as the memory 1031 in the communications device 1030 of FIG. 1 to determine the frame structure of the service advertisement frame. After determining the frame structure, the MAC logic may parse the service provider element to determine an updated LQI for each of the represented service providers and to update the LQI and other service information for the service providers in the service provider list associated with LQIs that are less than an LQI threshold (element 410). Then the MAC logic may parse the service information elements for each of the service providers to update the services for the service providers in the list of the service providers.

After updating the list of service providers maintained by the MAC logic, the MAC logic may generate and transmit a service advertisement frame that includes services for one or more or all of the service providers in the list of service providers (element 420). Transmitting the service advertisement frame may involve passing the service advertisement frame to the PHY as an MPDU to encapsulate and transmit the service advertisement frame.

In FIG. 4B, the flowchart 430 begins with determining to transmit a Leaving Message (element 435). In many embodiments, the MAC logic may receive an indication from a user that the station is about to leave the area or otherwise that the station will stop providing services in the area. In response, the MAC logic may determine to transmit a Leaving Message to inform neighboring stations that the station's services will no longer be available. In other embodiments, the station may determine that the station is moving away from the area by losing a connection with an access point and failing to receive some of the service advertisements periodically received from neighboring stations.

After determining to transmit a Leaving Message, the station may generate a frame such as a service advertisement frame including an indication that the station is terminating service advertisements or indicating that the station is no longer offering services. After generating the Leaving Message frame, the station may transmit the frame (element 440).

Figure 4C:
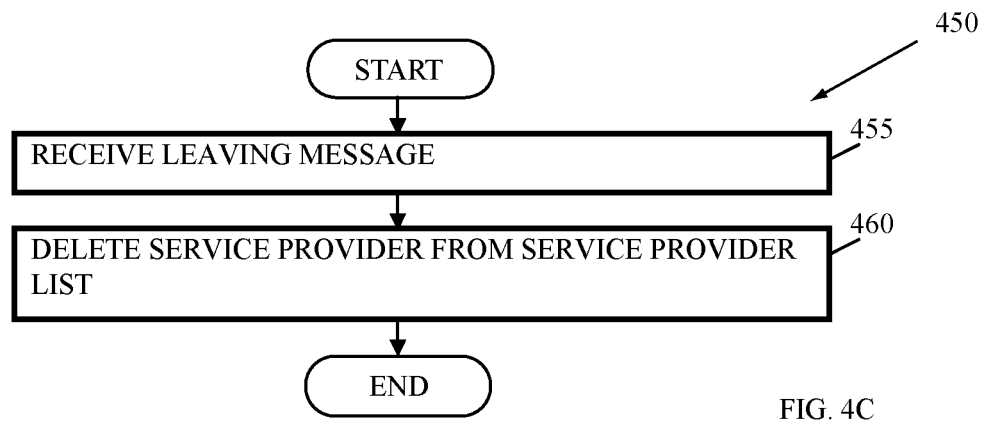

In FIG. 4C, the flowchart 450 begins with receiving a Leaving Message (element 455). In many embodiments, the MAC logic may receive the Leaving Message that comprises at least service provider information such as a service provider address (SA) and, in some embodiments, service information indicating the particular services that are no longer available.

In many embodiments, the MAC logic may access memory to access the list of service providers and delete or mark as deleted the entry or entries for the service provider that transmitted the Leaving Message (element 460).

The following examples pertain to further embodiments. One example comprises a method. The method may involve receiving, by a station, a frame comprising a transmit power value, a link quality value and service information associated with a service provider; determining a received signal strength value for the frame; determining an updated link quality value for the service provider; determining that the updated link quality value represents a link quality to store in memory; and storing, by the station, service advertisement information associated with the service provider in response to determining that the updated link quality value represents a link quality to store in memory.

In some embodiments, the method may further comprise generating, by a medium access control logic, a service advertisement frame comprising a transmit power field and one or more service provider elements, wherein the one or more service provider elements comprise a link quality field and one or more service information elements; and encapsulating, by physical layer logic, the service advertisement frame with a preamble to create a physical layer protocol data unit to transmit. In some embodiments, the method may further comprise generating, by a medium access control logic, a service advertisement frame comprising a transmit power value and service information associated with the station, the updated link quality for the service provider and the service information associated with the service provider. In many embodiments, the method may further comprise determining to transmit a Leaving Message and transmitting the Leaving Message, wherein transmitting the Leaving Message indicates to a member station of a service advertisement group to remove service advertisement information for the station from a service provider list maintained by the member station. In several embodiments, the method may further comprise receiving a Leaving Message and updating a service provider list in response to the Leaving Message. In several embodiments, determining a received signal strength value for the frame comprises calculating the received signal strength value based upon a received signal strength index (RSSI). In several embodiments, determining an updated link quality value for the service provider comprises calculating the updated link quality value based upon the transmit power value and the received signal strength value. And, in some embodiments, determining that the updated link quality value represents a link quality to store in memory comprises comparing the updated link quality value to a link quality threshold.

Another example comprises an apparatus. The apparatus may comprise a memory; a medium access control logic coupled with the memory to receive a frame comprising a transmit power value, a link quality value and service information associated with a service provider; determine a received signal strength value for the frame; determine an updated link quality value for the service provider; determine that the updated link quality value represents a link quality to store in memory; and store service advertisement information associated with the service provider in response to determining that the updated link quality value represents a link quality to store in the memory.

In some embodiments, the apparatus may further comprise physical layer logic to decode the frame and a receiver coupled with the medium access control logic and an antenna to receive the frame. In some embodiments, the medium access control logic comprises logic to generate a service advertisement frame comprising a transmit power field and one or more service provider elements, wherein the one or more service provider elements comprise a link quality field and one or more service information elements. In some embodiments, the medium access control logic comprises logic to generate a service advertisement frame comprising a transmit power value and service information associated with the station, the updated link quality for the service provider and the service information associated with the service provider. In some embodiments, the medium access control logic comprises logic to determine to transmit a Leaving Message and transmit the Leaving Message, wherein transmitting the Leaving Message indicates to a member station of a service advertisement group to remove service advertisement information for the station from a service provider list maintained by the member station. In some embodiments, the medium access control logic comprises logic to receive a Leaving Message and update a service provider list in response to the Leaving Message. In some embodiments, the medium access control logic comprises logic to calculate the received signal strength value based upon a received signal strength index (RSSI). In some embodiments, the medium access control logic comprises logic to calculate the updated link quality value based upon the transmit power value and the received signal strength value. And in some embodiments of the apparatus, the medium access control logic comprises logic to compare the updated link quality value to a link quality threshold.

Another example comprises a system. The system may comprise a physical layer logic to decode the frame; and a medium access control logic coupled with the physical layer logic to receive a frame comprising a transmit power value, a link quality value and service information associated with a service provider; determine a received signal strength value for the frame; determine an updated link quality value for the service provider; determine that the updated link quality value represents a link quality to store in memory; and store service advertisement information associated with the service provider in response to determining that the updated link quality value represents a link quality to store in memory.

In some embodiments, the system may further comprise an antenna coupled with the physical layer logic to receive the frame. In some embodiments, the medium access control logic comprises logic to generate a service advertisement frame comprising a transmit power field and one or more service provider elements, wherein the one or more service provider elements comprise a link quality field and one or more service information elements. In some embodiments, the medium access control logic comprises logic to generate a service advertisement frame comprising a transmit power value and service information associated with the station, the updated link quality for the service provider and the service information associated with the service provider. In some embodiments, the medium access control logic comprises logic to determine to transmit a Leaving Message and transmit the Leaving Message, wherein transmitting the Leaving Message indicates to a member station of a service advertisement group to remove service advertisement information for the station from a service provider list maintained by the member station. In some embodiments, the medium access control logic comprises logic to receive a Leaving Message and update a service provider list in response to the Leaving Message. In some embodiments, the medium access control logic comprises logic to calculate the received signal strength value based upon a received signal strength index (RSSI). In some embodiments, the medium access control logic comprises logic to calculate the updated link quality value based upon the transmit power value and the received signal strength value. And in some embodiments of the apparatus, the medium access control logic comprises logic to compare the updated link quality value to a link quality threshold.

Another example comprises a program product. The program product to filter service advertisement information may comprise a storage medium comprising instructions to be executed by a processor-based device, wherein the instructions, when executed by the processor-based device, perform operations, the operations comprising: receiving, by a station, a frame comprising a transmit power value, a link quality value and service information associated with a service provider; determining a received signal strength value for the frame; determining an updated link quality value for the service provider; determining that the updated link quality value represents a link quality to store in memory; and storing, by the station, service advertisement information associated with the service provider in response to determining that the updated link quality value represents a link quality to store in memory.

In some embodiments, the operations may further comprise generating, by a medium access control logic, a service advertisement frame comprising a transmit power field and one or more service provider elements, wherein the one or more service provider elements comprise a link quality field and one or more service information elements; and encapsulating, by physical layer logic, the service advertisement frame with a preamble to create a physical layer protocol data unit to transmit. In some embodiments, the operations may further comprise generating, by a medium access control logic, a service advertisement frame comprising a transmit power value and service information associated with the station, the updated link quality for the service provider and the service information associated with the service provider. In many embodiments, the operations may further comprise determining to transmit a Leaving Message and transmitting the Leaving Message, wherein transmitting the Leaving Message indicates to a member station of a service advertisement group to remove service advertisement information for the station from a service provider list maintained by the member station. In several embodiments, the operations may further comprise receiving a Leaving Message and updating a service provider list in response to the Leaving Message. In several embodiments, determining a received signal strength value for the frame comprises calculating the received signal strength value based upon a received signal strength index (RSSI). In several embodiments, determining an updated link quality value for the service provider comprises calculating the updated link quality value based upon the transmit power value and the received signal strength value. And, in some embodiments, determining that the updated link quality value represents a link quality to store in memory comprises comparing the updated link quality value to a link quality threshold.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method to filter service advertisement information, the method comprising:
   receiving, by a station, a frame comprising a transmit power value, a link quality value and service information associated with a service provider;
   determining, by the station, a received signal strength value for the frame;
   determining, by the station, an updated link quality value for the service provider;
   determining, by the station, if the updated link quality value represents a link quality to store in memory; and
   updating or adding, by the station, service advertisement information associated with the service provider in a list for service providers if the updated link quality value represents a link quality to store in memory;
   removing or not adding the service advertisement information in the list for service providers if the updated link quality value does not represent a link quality to store in memory; and
   determining to transmit a message and transmitting the message, wherein transmitting the message indicates to a member station of a service advertisement group to remove service advertisement information for the station from a service provider list maintained by the member station.

2. The method of claim 1, further comprising:
   generating a service advertisement frame comprising a transmit power field and one or more service provider elements, wherein the one or more service provider elements comprise a link quality field and one or more service information elements; and
   encapsulating the service advertisement frame with a preamble to create a physical layer protocol data unit to transmit.

3. The method of claim 1, further comprising generating a service advertisement frame comprising a transmit power value and service information associated with the station, the updated link quality for the service provider and the service information associated with the service provider.

4. The method of claim 1, further comprising receiving a Leaving Message and updating a service provider list in response to the Leaving Message.

5. The method of claim 1, wherein determining a received signal strength value for the frame comprises calculating the received signal strength value based upon a received signal strength index (RSSI).

6. The method of claim 1, wherein determining an updated link quality value for the service provider comprises calculating the updated link quality value based upon the transmit power value and the received signal strength value.

7. The method of claim 1, wherein determining that the updated link quality value represents a link quality to store in memory comprises comparing the updated link quality value to a link quality threshold.

8. A device to filter service advertisement information, the device comprising:
   a memory;
   logic comprising a processor coupled with the memory configured to:
     receive a frame comprising a transmit power value, a link quality value, and service information associated with a service provider;
     determine a received signal strength value for the frame;
     determine an updated link quality value for the service provider;
     determine if the updated link quality value represents a link quality to store in memory; and
     update or add service advertisement information associated with the service provider in a list for service providers if the updated link quality value represents a link quality to store in the memory;
     remove or not add the service advertisement information in the list for service providers if the updated link quality value does not represent a link quality to store in memory; and
     determine to transmit a message and transmit the message, wherein transmitting the message indicates to a member station of a service advertisement group to remove service advertisement information for the station from a service provider list maintained by the member station.

9. The device of claim 8, further comprising a receiver coupled with the logic and one or more antennas to receive the frame, wherein the logic comprises logic to decode the frame.

10. The device of claim 8, wherein the logic comprises logic to generate a service advertisement frame comprising a transmit power field and one or more service provider elements, wherein the one or more service provider elements comprise a link quality field and one or more service information elements.

11. The device of claim 8, wherein the logic comprises logic to generate a service advertisement frame comprising a transmit power value and service information associated with the station, the updated link quality for the service provider and the service information associated with the service provider.

12. The device of claim 8, wherein the logic comprises logic to receive a Leaving Message and update a service provider list in response to the Leaving Message.

13. The device of claim 8, wherein the logic comprises logic to calculate the received signal strength value based upon a received signal strength index (RSSI).

14. The device of claim 8, wherein the logic comprises logic to calculate the updated link quality value based upon the transmit power value and the received signal strength value.

15. The device of claim 8, wherein the logic comprises logic to compare the updated link quality value to a link quality threshold.

16. A system to filter service advertisement information, the system comprising:
   a physical layer logic to decode the frame; and
   a medium access control logic coupled with the physical layer logic, the medium access control logic comprising a processor configured to:
     receive a frame comprising a transmit power value, a link quality value and service information associated with a service provider;
     determine a received signal strength value for the frame;
     determine an updated link quality value for the service provider;
     determine if the updated link quality value represents a link quality to store in memory; and
     update or add service advertisement information associated with the service provider in a list for service providers if the updated link quality value represents a link quality to store in memory;

remove or not add the service advertisement information in the list for service providers if the updated link quality value does not represent a link quality to store in memory; and determine to transmit a message and transmit the message, wherein transmitting the message indicates to a member station of a service advertisement group to remove service advertisement information for the station from a service provider list maintained by the member station.

17. The system of claim 16, further comprising a radio and one or more antennas coupled with the physical layer logic to receive the frame.

18. The system of claim 16, wherein the medium access control logic comprises logic to generate a service advertisement frame comprising a transmit power field and one or more service provider elements, wherein the one or more service provider elements comprise a link quality field and one or more service information elements.

19. The system of claim 16, wherein the medium access control logic comprises logic to generate a service advertisement frame comprising a transmit power value and service information associated with the station, the updated link quality for the service provider and the service information associated with the service provider.

20. The system of claim 16, wherein the medium access control logic comprises logic to receive a Leaving Message and update a service provider list in response to the Leaving Message.

21. The system of claim 16, wherein the medium access control logic comprises logic to calculate the received signal strength value based upon a received signal strength index (RSSI).

22. The system of claim 16, wherein the medium access control logic comprises logic to calculate the updated link quality value based upon the transmit power value and the received signal strength value.

23. The system of claim 16, wherein the medium access control logic comprises logic to compare the updated link quality value to a link quality threshold.

24. A machine-accessible product comprising:
a non-transitory medium containing instructions to filter service advertisement information, wherein the instructions, when executed by an access point, causes the access point to perform operations, the operations comprising:

receiving a frame comprising a transmit power value, a link quality value and service information associated with a service provider;

determining a received signal strength value for the frame;

determining an updated link quality value for the service provider;

determining if the updated link quality value represents a link quality to store in memory; and updating or adding service advertisement information associated with the service provider in a list for service providers if the updated link quality value represents a link quality to store in memory;

removing or not adding the service advertisement information in the list for service providers if the updated link quality value does not represent a link quality to store in memory; and determining to transmit a message and transmitting the message, wherein transmitting the message indicates to a member station of a service advertisement group to remove service advertisement information for the station from a service provider list maintained by the member station.

25. The machine accessible product of claim 24, wherein the operations further comprise:

generating a service advertisement frame comprising a transmit power field and one or more service provider elements, wherein the one or more service provider elements comprise a link quality field and one or more service information elements; and encapsulating the service advertisement frame with a preamble to create a physical layer protocol data unit to transmit.

26. The machine accessible product of claim 24, wherein the operations further comprise generating a service advertisement frame comprising a transmit power value and service information associated with the station, the updated link quality for the service provider and the service information associated with the service provider.

* * * * *